March 14, 1939.　　　P. C. STETSON　　　2,150,703

CAMERA FOCUSING ATTACHMENT

Filed June 5, 1937

Paul C. Stetson,
INVENTOR:

BY

ATTORNEYS.

Patented Mar. 14, 1939

2,150,703

UNITED STATES PATENT OFFICE 2,150,703

CAMERA FOCUSING ATTACHMENT

Paul C. Stetson, Rochester, N. Y., assignor to Eastman Kodak Company, Rochester, N. Y., a corporation of New Jersey Application June 5, 1937, Serial No. 146,631

3 Claims. (Cl. 24—1)

The present invention relates to cameras, and more particularly to the type of cameras in which focusing is done on a ground glass screen which is positioned in the focal plane of the camera objective. In cameras of this type a focusing cloth or hood encases the rear end of the camera as well as the operator's head to shut off stray light so that the objective being focused can be clearly seen on the ground glass screen.

An object of the present invention is the provision of a focusing cloth clip which securely holds the focusing cloth in position to shut off stray light from the ground glass screen, yet permits the easy and ready removal of the cloth when desired.

Another object of the invention is the provision of a clip of this class which facilitates the easy securing of the focusing cloth to the camera body.

A further object of the invention is the provision of a clip of the class described which is made of few parts, is compact in arrangement, is inexpensive to manufacture, and is highly effective in use.

A still further object of the invention is the provision of a suitable focusing cloth clip which can readily be applied to cameras already on the market by drilling a single hole through which the clip may be assembled, as well as one which may be added to cameras being built with a minimum effort and expense.

To these and other ends, the invention resides in certain improvements and combinations of parts all as will be hereinafter more fully described, the novel features being pointed out in the claims at the end of the specification.

In the drawing.

Similar reference numerals throughout the several views indicate the same parts.

Figure 1:
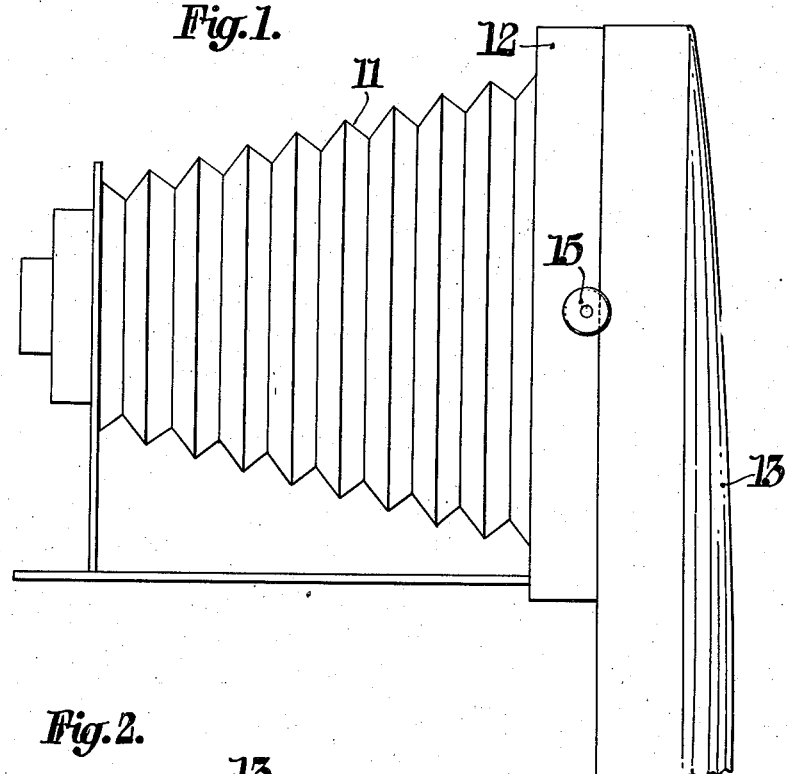
Fig. 1 is a side elevation of a camera of the "view" type, showing the relation thereto of a focusing cloth clip constructed in accordance with the present invention.

Referring now to the drawing wherein is shown a camera of the type known as a "View Camera" in which focusing is done through the rear of the camera on a ground glass screen which is positioned in the focal plane of the camera objective. In order to exclude light from the rear of the camera, a focusing hood or cloth is used to encase the operator's head as well as the rear portion of the camera, as is well known to those in the art.

In using such cloths, it has been found that the cloth may be accidentally displaced, or may slip, or, when used outdoors, may blow away, thus admitting light to the rear face of the ground glass screen, the disadvantage of which is obvious. In order to overcome these difficulties, the present invention provides a focusing cloth clip which not only securely holds the cloth in adjusted position, but permits the ready and easy securing of the cloth to or removing it from the camera body.

Referring now to Fig. 1, there is shown a camera generally indicated by the numeral 11. The rear body portion of the camera is in the form of a rigid rectangular member 12, in the present instance of metal, which holds a ground glass screen and a plate or film holder, not shown. A focusing cloth 13 is utilized to enclose the rear end of the camera to permit focusing on the ground glass screen, as is well known to those in the art.

Figure 2:
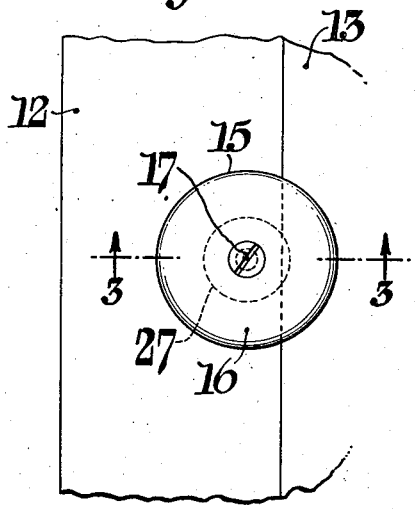
Fig. 2 is an enlarged view of a portion of the camera illustrated in Fig. 1, showing the preferred form of focusing cloth clips.

The focusing cloth is held in position by means of clips, generally indicated by the numeral 15, arranged on opposite sides of the portion 12, one of these clips being clearly illustrated in Figs. 1 and 2. As the clips in the present embodiment of my invention are on opposite sides of the camera body portion 12 and are of identical construction, only one will be herein described. While I have found that two of such clips are satisfactory, any required number may be used, depending on the size of the camera and the dimensions of the focusing cloth and other variables. It is sometimes desirable to provide similar clips on the top and/or bottom as well as on the side walls of the camera body.

Figure 3:
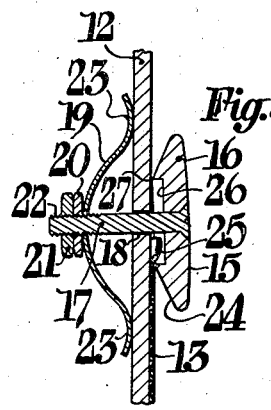
Fig. 3 is a sectional view taken substantially on the line 3—3 of Fig. 2, showing the detailed arrangement of the clip and the manner of detachably securing the focusing cloth to the camera body.

In the present embodiment of the invention, each clip is preferably in the form of a thin circular member or button 16 which is secured in any suitable manner to one end of a screw, stud, or bolt 17, as in Fig. 3. The bolt extends through an opening 18 in the side of the portion 12 of the camera body, and has loosely mounted thereon a leaf spring 19 which is held in position by a nut 20 and a lock nut 21 which engage an innerthreading portion 22 of the screw 17, all of which is clearly illustrated in Fig. 3. The leaf spring has the end thereof formed to provide bent bearing portions or feet 23 which engage the inner surface of the portion 12 and thus tend to force the screw 17 and the button 16 inwardly, or to the left as viewed in Fig. 3, to securely retain the button in engaging the outer surface of the camera body portion 12. The tension of the spring 19 may be varied or adjusted by moving the nuts 20 and 21 along the stud 17, as is apparent from an inspection of Fig. 3. While the button 16 and screw 17 have been shown as separate parts, it is contemplated that they may be formed integrally if desired.

To facilitate the insertion of the cloth 13 under the button 16, the latter has an annular portion of the under surface adjacent to the periphery thereof inclined or beveled, as shown at 24 in Fig. 3. This beveled surface thus guides and directs the edge of the cloth between the button 16 and the camera body portion 12. The cloth 13 may thus be positioned and held merely by laying it over the top of the camera body portion 12 and pulling it tightly down over the sides thereof, and then slipping the forward edges of the cloth under the buttons 16. By means of this arrangement the focusing cloth is securely held in place to shut off any light on the ground glass screen, yet may be easily and quickly removed merely by pulling the cloth so that it slides from under the buttons 16.

When the cloth 13 is slipped under the buttons 16, the forward edges thereof may tend to fold or wrinkle as shown at 25, Fig. 3. In order to prevent this folded portion of the cloth from holding the button 16 away from the camera body portion 12, the under side of the button is recessed at 26 to receive the folded or curled edge of the cloth 13. Referring now to Fig. 3, it is seen that the edge of the recess 26 provides a thin annular ring or gripping portion 27 which tightly engages the cloth 13 and securely holds the latter in engagement with the portion 12, by reason of the action of the leaf spring 19, all of which is clearly shown in Fig. 3.

It is thus apparent from the above description that the present invention provides a focusing cloth clip which is not only simple in construction, but which also securely retains the cloth in a light excluding position, yet permits the ready and easy removal of the cloth when desired. It is also apparent that the arrangement of the annular inclined portion 24 as well as the thin annular gripping ring 27 enables the focusing cloth 13 to be inserted under the button 16 from different positions or sides. It should also be noted that by drilling a single hole in the camera body portion 12 that the clip can be inserted on cameras already on the market, and that the assembling operation can be readily carried out by unskilled hands.

While one embodiment only of the invention has been disclosed, it is to be understood that the inventive idea may be carried out in a number of ways. This application is, therefore, not to be limited to the precise details described, but is intended to cover all variations and modifications thereof falling within the spirit of the invention and the scope of the appended claims.

I claim:

1. A focusing cloth clip, adapted to be placed on cameras having a hole drilled through the side wall thereof, said clip comprising an inclined annular member for gripping and holding the focusing cloth against one face of said wall, a stud carrying said annular member adapted to pass through the hole in the camera wall, a curved spring on said stud adapted to engage the opposite face of said camera wall to hold the annular focusing cloth clamping member against said one face, and means movable along said stud and engaging said spring to vary the tension of the latter.

2. A focusing cloth clip, adapted to be placed on a support having a hole formed therethrough, said clip comprising a flat button substantially larger than said hole and having an annular gripping portion, adapted to engage and hold said cloth against one side of said support, an annular inclined portion on the under side of said button concentric with said portion to facilitate the insertion of said cloth between said portion and said one face, a stud on said button extending through said hole, a leaf spring mounted on said stud and engaging the opposite side of said support to yieldably hold said portion against said one side, and means on said stud for varying the tension of said spring.

3. A focusing cloth clip, adapted to be placed on a support having a hole formed therethrough, said clip comprising a flat button substantially larger than said hole and provided with a stud adapted to extend through said hole, said button having the under surface thereof formed with a recess adjacent said stud, an annular gripping portion on said surface adjacent said recess to grip and hold said cloth against one side of said support, an inclined portion on said surface adjacent said portion to facilitate the insertion of said cloth thereunder, a leaf spring mounted on the free end of said stud and engaging the opposite side of said support, and means mounted on and movable along said stud and engaging said spring for varying the tension thereof to yieldably maintain said portion in engagement with said one side.

PAUL C. STETSON.